(12) United States Patent
Kawamura et al.

(10) Patent No.: US 11,602,139 B2
(45) Date of Patent: Mar. 14, 2023

(54) FISHING ROD

(71) Applicant: GLOBERIDE, INC., Tokyo (JP)

(72) Inventors: Takuji Kawamura, Tokyo (JP);
Hirokazu Yamamoto, Tokyo (JP);
Hideaki Teshirogi, Tokyo (JP)

(73) Assignee: GLOBERIDE, Inc., Tokyo (JP)

(*) Notice: Subject to any disclaimer, the term of this patent is extended or adjusted under 35 U.S.C. 154(b) by 1012 days.

(21) Appl. No.: 16/334,669

(22) PCT Filed: Jun. 20, 2017

(86) PCT No.: PCT/JP2017/022731
§ 371 (c)(1),
(2) Date: Mar. 19, 2019

(87) PCT Pub. No.: WO2018/061345
PCT Pub. Date: Apr. 5, 2018

(65) Prior Publication Data
US 2021/0127654 A1    May 6, 2021

(30) Foreign Application Priority Data
Sep. 29, 2016  (JP) .............................. JP2016-191740

(51) Int. Cl.
*A01K 87/02*  (2006.01)
*B29C 53/56*  (2006.01)
*B29L 31/00*  (2006.01)

(52) U.S. Cl.
CPC ............ *A01K 87/02* (2013.01); *B29C 53/564* (2013.01); *B29L 2031/7002* (2013.01)

(58) Field of Classification Search
CPC .................................. A01K 87/00; A01K 87/02
(Continued)

(56) References Cited

U.S. PATENT DOCUMENTS 1,231,150 A * 6/1917 Gere ..................... A01K 87/00
43/18.1 R
3,128,895 A * 4/1964 Nelle ................. B65D 23/0892
47/72
(Continued)

FOREIGN PATENT DOCUMENTS

CN        1788555 A    6/2006
CN      104067993 A   10/2014
(Continued)

OTHER PUBLICATIONS

JP2005229955A Translation of description from Espacenet (Year: 2005).*
(Continued)

*Primary Examiner* — Darren W Ark
*Assistant Examiner* — Katelyn T Truong
(74) *Attorney, Agent, or Firm* — K&L Gates LLP

(57) ABSTRACT

A fishing rod includes a rod section and a fitting having a securing portion, the fitting being firmly secured to the rod section without inhibiting bending of the rod section, the securing portion having an excellent outer appearance. On a securing portion of a fishing line guide placed on the rod section, a prepreg sheet formed of plain-woven reinforcement fibers impregnated with a thermosetting resin is wound to secure the fishing line guide. The prepreg sheet is wound and secured so that, with respect to an axial direction, reinforcement fibers are in oblique directions, and intersecting angles of the reinforcement fibers in a winding region on a part of the rod section located beyond a distal end of the securing portion are smaller than those of the reinforcement fibers in a winding region on the securing portion.

8 Claims, 5 Drawing Sheets

(58) Field of Classification Search
USPC .............................................. 43/18.1 R, 18.5
See application file for complete search history.

(56) References Cited

U.S. PATENT DOCUMENTS

| | | | | | |
|---|---|---|---|---|---|
| 4,263,246 | A | * | 4/1981 | Mercer | B65B 9/13 |
| | | | | | 215/DIG. 6 |
| 5,997,970 | A | * | 12/1999 | You | D04C 1/02 |
| | | | | | 156/169 |
| 7,125,352 | B2 | * | 10/2006 | Gagnon | B29C 70/30 |
| | | | | | 473/563 |
| 2015/0296761 | A1 | | 10/2015 | Sugaya et al. | |
| 2016/0088821 | A1 | | 3/2016 | Omura | |

FOREIGN PATENT DOCUMENTS

| | | |
|---|---|---|
| CN | 105307486 A | 2/2016 |
| GB | 1028380 A | 5/1966 |
| JP | 02-026474 U1 | 2/1990 |
| JP | 64-9408 U | 6/1990 |
| JP | 03-126464 U1 | 12/1991 |
| JP | 2005-229955 A | 9/2005 |
| JP | 2009-178132 A | 8/2009 |
| JP | 2013-202004 A | 10/2013 |
| JP | 2014-045719 A | 3/2014 |
| JP | 5923363 B2 * | 5/2016 |

OTHER PUBLICATIONS

International Search Report PCT/JP2017/022731 dated Sep. 26, 2017 with English translation.
First Office Action dated Nov. 25, 2020 issued in corresponding Chinese Patent Application No. 201780058853.2 with English translation (13 pgs.).
Extended European Search Report dated Apr. 29, 2020 issued in corresponding EP Application No. EP 17855304.6 (8 pages).
Second Office Action dated Jun. 7, 2021, issued in corresponding Chinese Patent Application No. 201780058853.2 with English translation (10 pgs.).
International Preliminary Report on Patentability and Written Opinion of the International Searching Authority dated Apr. 2, 2019 issued in corresponding International Application No. PCT/JP2017/022731 with English translation.
Rejection Decision dated Sep. 1, 2021, issued in corresponding Chinese Patent Application No. 201780058853.2 with English translation (9 pgs.).

* cited by examiner

FISHING ROD

CROSS-REFERENCE TO RELATED APPLICATIONS

This application is the U.S. National Phase of PCT/JP2017/022731, filed Jun. 20, 2017, which claims the benefit of priority from Japanese Patent Application Serial No. 2016-191740 filed Sep. 29, 2016, the contents of each of which are hereby incorporated by reference in their entirety. The present invention relates to a fishing rod and particularly to a fishing rod characterized by a structure for securing a fitting to the fishing rod, more specifically, for securing a fitting such as a fishing line guide or a reel seat to a rod section.

TECHNICAL FIELD

Background

Conventionally, there is known a fishing rod used with a reel mounted thereon, in which a component (hereinafter, referred to also as a fitting) such as a fishing line guide or a reel seat is secured on a surface of a rod section. In order to secure such a fitting, a securing thread is wound on the fitting in a state of being placed on the rod section and a synthetic resin is applied on a surface thereof.

Furthermore, in addition to the above-described securing structure, for example, Patent Literature 1 discloses that a prepreg sheet formed of plain-woven reinforcement fibers impregnated with a synthetic resin is wound on a securing portion of a fitting and then is heated so as to cure the synthetic resin, thus securing the fitting. This prepreg sheet for securing disclosed in Patent Literature 1 is wound and secured in a state where the reinforcement fibers are aligned at 0°, 90° with respect to an axial direction of a fishing rod. Furthermore, as a prepreg sheet for securing a reel seat, which is a fitting, to a rod section, for example, Patent Literature 2 discloses the use of a prepreg sheet including reinforcement fibers arranged regularly at 90° with respect to an axial direction of a fishing rod.

RELEVANT REFERENCES

List of Relevant Patent Literature

Patent Literature 1: Japanese Utility Model Application Publication No. H02-26474
Patent Literature 2: Japanese Utility Model Application Publication No. H01-9408

SUMMARY

The above-described prepreg sheet used for the securing structure disclosed in Patent Literature 1 includes a layer in which the reinforcement fibers are oriented in the axial direction in an area extending from a securing portion of a fishing line guide to a rod section. Because of this, the prepreg sheet has increased rigidity with respect to a bending direction of the rod section, thus inhibiting bending. Furthermore, in a fishing rod including a plurality of rod sections jointed together, in order to joint/disjoint the rod sections, in some cases, the rod sections are twisted with respect to each other with a fishing line guide grasped, so that a load in a twisting direction might act on a securing portion of the fishing line guide. In this case, in the prepreg sheet wound on and secured to the securing portion, breakage of the reinforcement fibers oriented in a circumferential direction is likely to occur, resulting in a failure to obtain a sufficient level of twist strength. Moreover, at the time of winding, in a vicinity of a distal end of the securing portion, due to a change in diameter between a winding diameter on the securing portion and a winding diameter on a surface of the rod section, a prepreg sheet including reinforcement fibers aligned at 0°, 90° can hardly be wound so as to correspond to a change in shape, thus suffering from formation of wrinkles and hence a deterioration in outer appearance.

The above-described prepreg sheet used for the securing structure disclosed in Patent Literature 2 includes reinforcement fibers oriented in a circumferential direction. Because of this, the prepreg sheet does not have a sufficient level of twist strength, thus failing to firmly prevent a securing portion from being lifted and hence to achieve a sufficient level of securing strength with respect to the rod section.

The present invention is intended to overcome the above-described problems, and one object thereof is to provide a fishing rod including a rod section and a fitting having a securing portion, the fitting being firmly secured at the securing portion to the rod section without inhibiting bending of the rod section, the securing portion having an excellent outer appearance.

In order to achieve the above-described object, the present invention is characterized in that in a fishing rod including a molded rod section having a surface and a fitting having a securing portion, the fitting being placed and secured on the surface of the rod section with a prepreg sheet wound on the securing portion of the fitting, the prepreg sheet being formed of plain-woven reinforcement fibers impregnated with a thermosetting resin, the prepreg sheet is disposed so that the reinforcement fibers are in oblique directions with respect to an axial direction, and the prepreg sheet is wound and secured so that intersecting angles of the reinforcement fibers with respect to the axial direction in a winding region on a part of the rod section located beyond a distal end of the securing portion are smaller than intersecting angles of the reinforcement fibers with respect to the axial direction in a winding region on the securing portion.

In the fishing rod configured as above, the prepreg sheet formed of plain-woven reinforcement fibers is disposed so that, on the securing portion of the fitting, the reinforcement fibers are in oblique directions with respect to the axial direction. This configuration suppresses rigidity in the axial direction, thus reducing inhibition of bending of the rod section, and also increases twist strength at the securing portion, thus improving securing strength of the fitting, so that the prepreg sheet is easily wound so as to correspond to a change in shape. Particularly, the prepreg sheet is wound and secured so that intersecting angles of the reinforcement fibers with respect to the axial direction in a winding region on the part of the rod section located beyond the distal end of the securing portion are smaller than intersecting angles of the reinforcement fibers with respect to the axial direction in a winding region on the securing portion, so that it is less likely that wrinkles are formed at a winding portion, thus achieving an improvement in outer appearance. Moreover, on a side beyond the distal end of the securing portion, an orientation of the reinforcement fibers relatively approximates to the axial direction, and thus it is less likely that rising of the reinforcement fibers occurs, so that it is possible to effectively hold down the securing portion and thus to improve securing strength.

In winding the above-described prepreg sheet formed of plain-woven reinforcement fibers in a region surrounding the securing portion of the fitting, on the securing portion, the prepreg sheet is wound in a circumferential direction, and on the part of the rod section located beyond the securing portion, the prepreg sheet is wound in the circumferential direction while a tension is applied in the axial direction toward a proximal end side of the fishing rod. Thus, intersecting angles of the reinforcement fibers with respect to the axial direction in a winding region on the part of the rod section located beyond the distal end of the securing portion can be made smaller than intersecting angles of the reinforcement fibers with respect to the axial direction in a winding region on the securing portion. Thus, winding is performed so as to correspond to a change in diameter, which makes it possible for the prepreg sheet when thermally cured to have a well-looking outer appearance without wrinkles formed therein.

Advantages

According to the present invention, it is possible to provide a fishing rod including a rod section and a fitting having a securing portion, the fitting being firmly secured at the securing portion to the rod section without inhibiting bending of the rod section, the securing portion having an excellent outer appearance.

DESCRIPTION OF THE PREFERRED EMBODIMENTS

Figure 1:
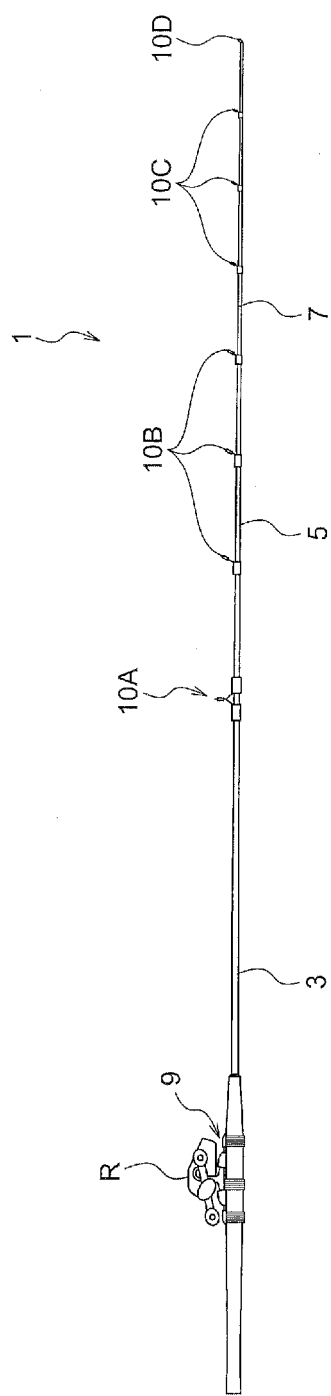
FIG. 1 is a view showing one embodiment of a fishing rod according to the present invention.

An embodiment of a fishing rod according to the present invention will now be specifically described with reference to the appended drawings. FIG. 1 is a view showing one embodiment of the fishing rod according to the present invention. A fishing rod 1 of this embodiment includes a butt-side rod section 3, an intermediate rod section 5, and a tip rod section 7 (each referred to also as a rod section), and these rod sections are ordinarily jointed to each other. Furthermore, in the fishing rod 1 of this embodiment, the butt-side rod section 3 is provided with a reel seat 9, and a fishing line guide for guiding a fishing line is attached at each appropriate location on the butt-side rod section 3, the intermediate rod section 5, and the tip rod section 7, the fishing line being released from a reel R mounted to the reel seat 9. In FIG. 1, a fishing line guide provided on the butt-side rod section 3 is denoted as 10A, a fishing line guide provided on the intermediate rod section 5 is denoted as 10B, and a fishing line guide provided on the tip rod section 7 is denoted as 10C. Furthermore, a top guide 10D is attached to a distal end of the tip rod section 7. In this case, the fishing line guides (top guides) 10A to 10D and the reel seat 9 each constitute a fitting secured on a surface (an outer peripheral surface) of the rod sections.

Preferably, the butt-side rod section 3, the intermediate rod section 5, and the tip rod section 7 are formed of a tubular body made of a fiber-reinforced resin and each formed in a tubular shape having predetermined dimensions in accordance with a conventional method. As the conventional method, for example, a fiber-reinforced resin prepreg (a prepreg sheet) is wound on a core bar and subjected to a heating step, after which the core bar is pulled out. The fiber-reinforced resin prepreg used in this case is formed by impregnating reinforcement fibers (mainly, carbon fibers, glass fibers, or the like) with a thermosetting synthetic resin such as an epoxy resin. These rod sections can be molded in various forms. For example, they can be formed in a solid structure or by jointing a tubular body to a solid core material (for example, a superelastic alloy wire rod or a superelastic resin material).

Figure 2:
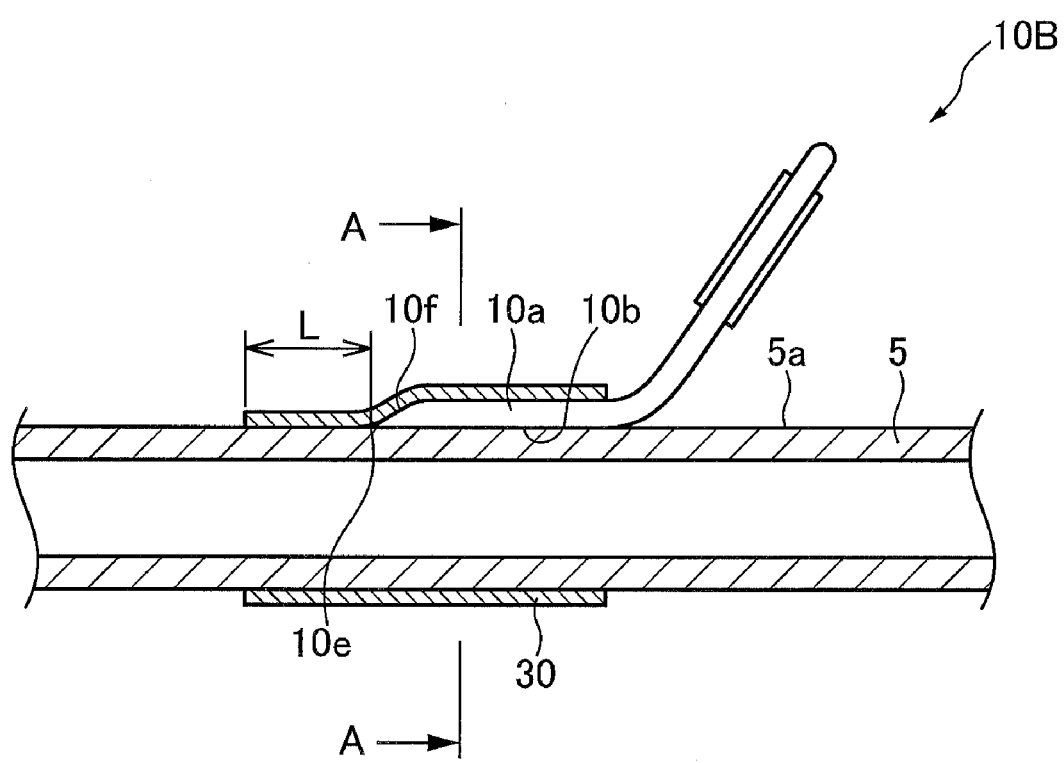
FIG. 2 is a schematic sectional view showing a secured state of a leg portion of a fishing line guide of the fishing rod shown in FIG. 1.
Figure 3:
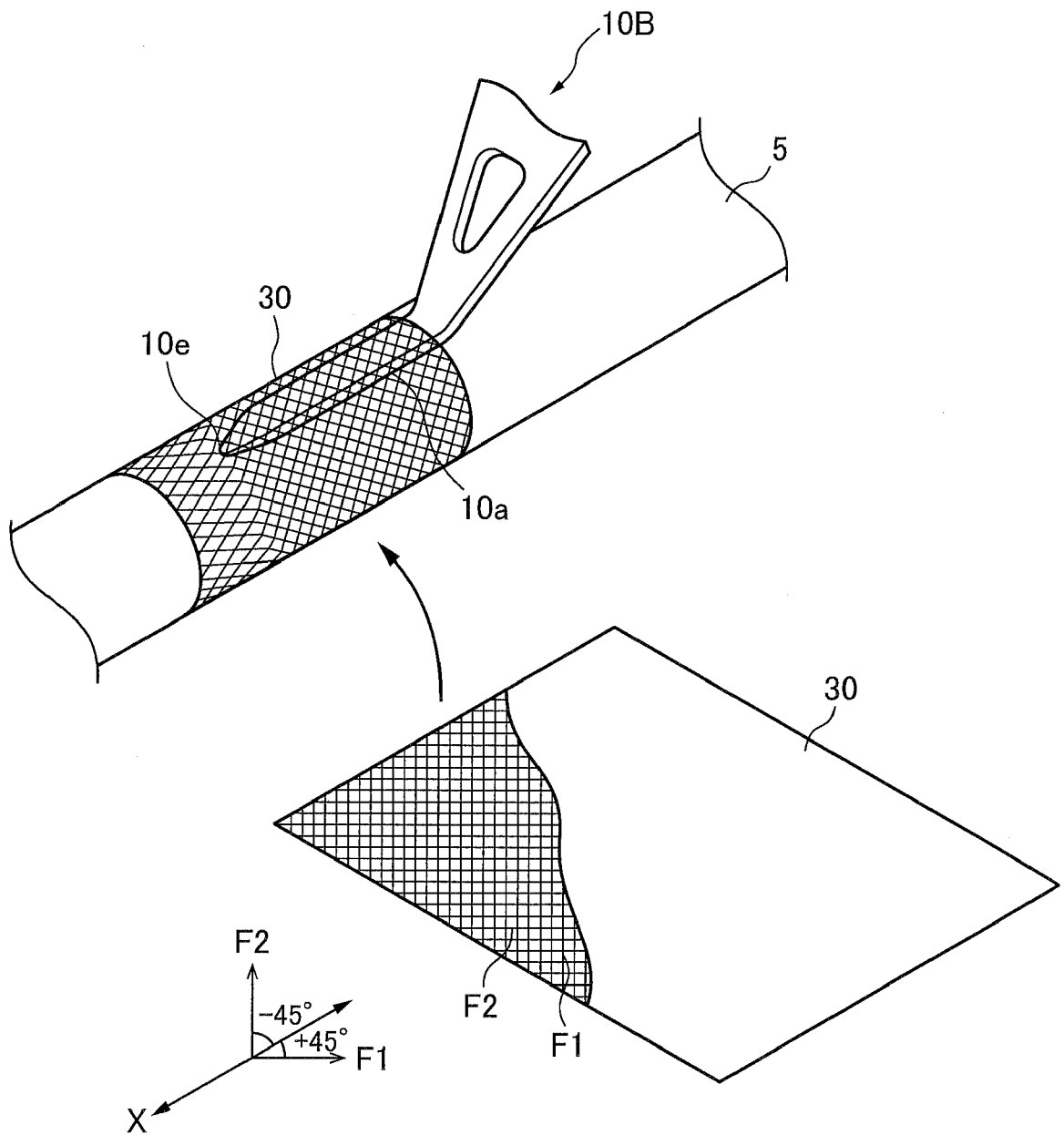
FIG. 3 is a schematic perspective view showing a configuration of a prepreg sheet used to secure a securing portion of the fishing line guide to a rod section.
Figure 4:
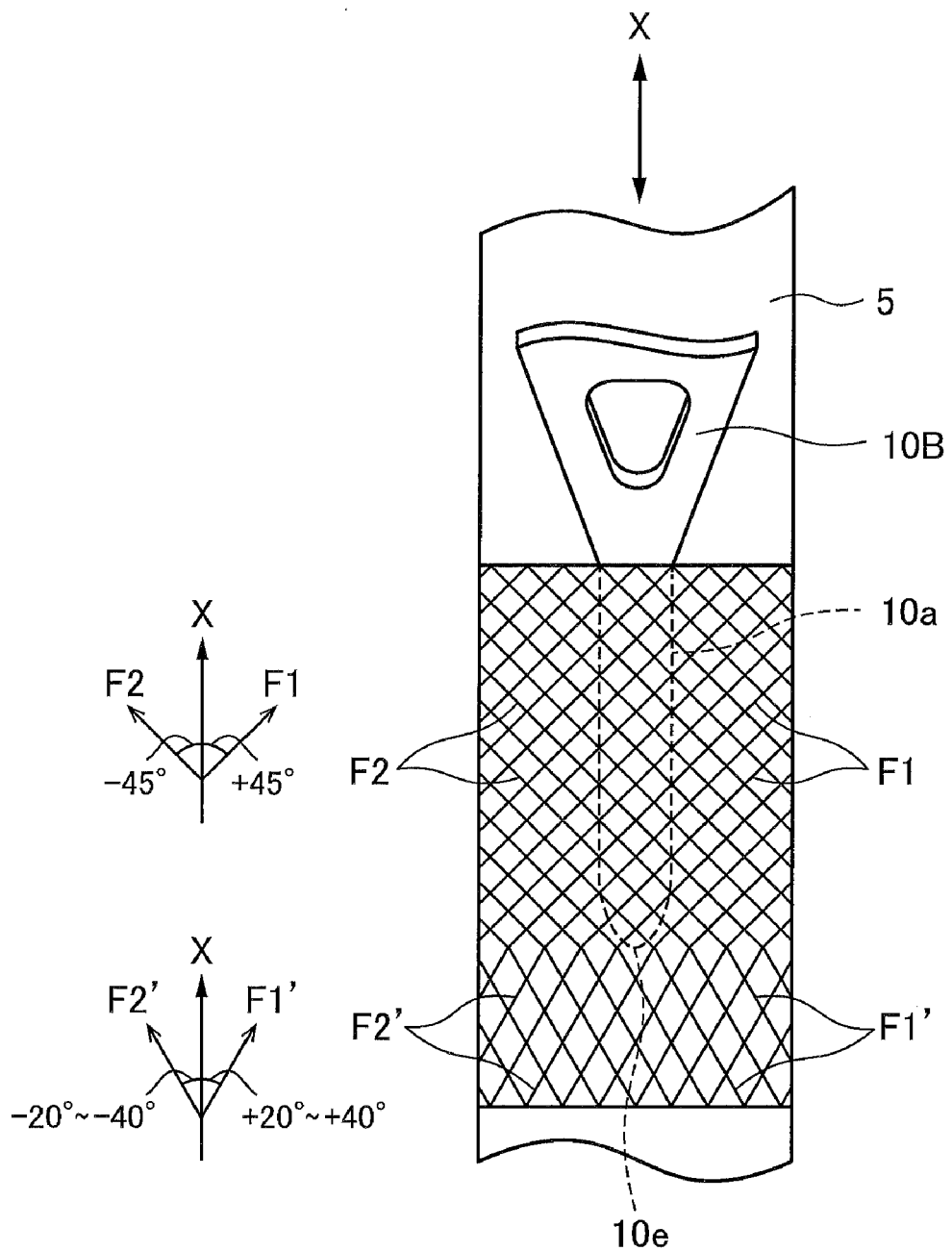
FIG. 4 is an enlarged view of the prepreg sheet wound on and secured to a region surrounding the securing portion.
Figure 5:
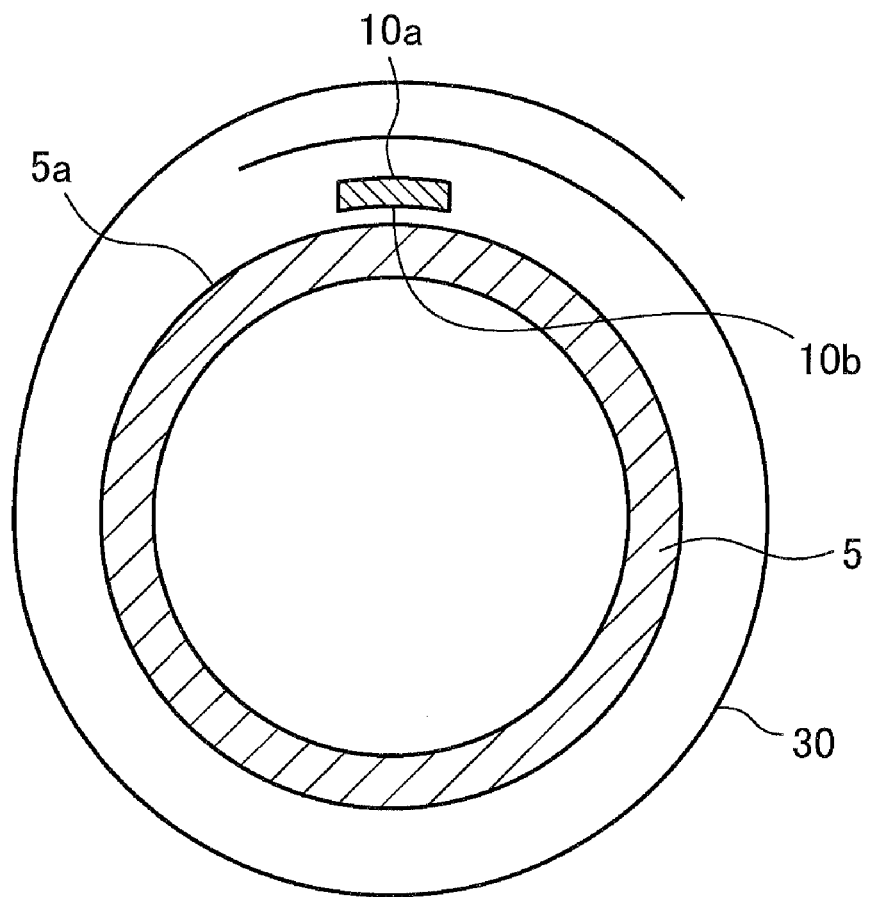
FIG. 5 is a sectional view along a line A-A in FIG. 3.

Outer surfaces of the rod sections configured as above have been surface-treated by coating or the like, and the above-described fitting is mounted to the rod sections in this surface-treated state. By using the fishing line guide 10B as an example, the following describes a method for securing the fitting and a securing structure thereof according to this embodiment. FIG. 2 to FIG. 5 are views for explaining a method for securing the fishing line guide 10B. To be more specific, FIG. 2 is a schematic sectional view showing a secured state of a leg portion of the fishing line guide of the fishing rod shown in FIG. 1, FIG. 3 is a schematic perspective view showing a configuration of a prepreg sheet used to secure a securing portion of the fishing line guide to a rod section, FIG. 4 is an enlarged view of the prepreg sheet wound on and secured to a region surrounding the securing portion, and FIG. 5 is a sectional view along a line A-A in FIG. 3.

As shown in FIG. 2 and FIG. 3, a securing portion 10a of the fishing line guide 10B, which is the fitting, is placed on a surface of the rod section (the intermediate rod section) 5 molded. Then, a sheet member (a prepreg sheet) 30 made of a thermosetting resin is wound thereon. Further, such a wound state is secured by use of a fastening tape (not shown), after which a wound body thus obtained is put in a heating furnace and heat-treated. In the heating furnace, when a predetermined temperature (a thermosetting temperature) is reached, the thermosetting resin is cured, and thus the fishing line guide 10B is secured on the rod section.

In this case, since the securing portion 10a has a width smaller than a diameter of the rod section 5 and extends in an axial direction, and a lower surface 10b of the securing portion 10a is a flat surface or a curved surface having a curvature different from that of the rod section, the sheet member made of a thermosetting resin may be previously and initially wound on the rod section 5. With this configuration, even when there is a gap between the lower surface 10b of the securing portion and a surface Sa of the rod section, such a gap can be filled with the resin that flows at the time of heating, and thus adhesion to the surface of the rod section can be enhanced.

As the prepreg sheet 30, there is used a sheet-shaped member formed of reinforcement fibers such as carbon fibers or glass fibers in plain-woven form impregnated with a thermosetting resin such as an epoxy resin, a nylon resin, a polyethylene resin, a polypropylene resin, a phenol resin, an unsaturated polyester resin, a vinyl ester resin, an urea resin, a melamine resin, a silicon resin, or a polyurethane resin. That is, the plain-woven reinforcement fibers of the prepreg sheet 30 are aligned in directions intersecting at right angles. The prepreg sheet 30 thus described is cut in skew directions with respect to the intersecting reinforcement fibers, and a cut piece of prepreg sheet thus obtained is wound so that the reinforcement fibers are arranged obliquely with respect to the axial direction of the rod section.

In this embodiment, as shown in FIG. 3 and FIG. 4, the prepreg sheet 30 is cut into a rectangular shape so as to be in (+45°, −45°) directions with respect to a group F1 of reinforcement fibers and a group F2 of reinforcement fibers intersecting with each other, and a cut piece of prepreg sheet thus obtained is wound on the securing portion 10a so that these groups of reinforcement fibers are inclined at ±45° with respect to an axial direction X of the rod section 5.

As for the number of plies of the prepreg sheet 30 wound, the prepreg sheet 30 could be cut so that it can be wound in one or more plies, and preferably, as shown in FIG. 5, the prepreg sheet 30 is wound in two or less plies on the rod section 5 in a state where the securing portion 10a is placed thereon. In this case, winding the prepreg sheet 30 in two or more plies on the rod section leads to a weight increase and is not easy. It is, therefore, preferable that the number of plies of the prepreg sheet 30 wound be set to two or less, and that the prepreg sheet 30 be wound so that overlapping portions of the prepreg sheet 30 after being wound in one ply lie on the securing portion 10a of the fishing line guide 10B. The prepreg sheet 30 is wound so that overlapping portions of the prepreg sheet 30 lie in a region surrounding the securing portion 10a in this manner, and thus it is possible to establish a stably (firmly) secured state of the fishing line guide 10B.

Furthermore, the above-described prepreg sheet 30 is wound on the securing portion 10a so that intersecting angles of the reinforcement fibers with respect to the axial direction in a winding region on a part of the rod section located beyond a distal end 10e of the securing portion 10a are smaller than intersecting angles of the reinforcement fibers with respect to the axial direction in a winding region on the securing portion 10a. In FIG. 4, in the region surrounding the securing portion 10a, the group F1 of reinforcement fibers and the group F2 of reinforcement fibers are wound and secured at ±45° with respect to the axial direction X, and on the part of the rod section located beyond the distal end 10e of the securing portion 10a, a group F1' of reinforcement fibers and a group F2' of reinforcement fibers are wound and secured at about ±40° with respect to the axial direction X. In this case, on the part of the rod section located beyond the distal end 10e of the securing portion 10a, when the intersecting angles are too small, bending elasticity of that part becomes higher to hinder smooth bending of the rod section, and thus the intersecting angles at that part could be set to ±20° or more.

A transition area from the distal end 10e of the securing portion 10a to the surface Sa of the rod section is also where a large change in diameter occurs. When the prepreg sheet 30 is wound in this area as is normally wound, wrinkles are formed in a boundary area between the distal end 10e of the securing portion 10a and the surface Sa of the rod section. To avoid this, on the securing portion 10a, the prepreg sheet is wound in a circumferential direction, and on the part of the rod section located beyond the securing portion, the prepreg sheet is wound in the circumferential direction while a tension is applied in the axial direction toward a proximal end side of the fishing rod, and then the prepreg sheet is secured in this state by use of a fastening tape. When the prepreg sheet 30 is wound in this manner, due to a change in diameter and a stretched state in a boundary region between the distal end 10e of the securing portion 10a and the surface Sa of the rod section, square-shaped meshes are stretched into diamond-shaped meshes, and thus the prepreg sheet 30 can be wound so that intersecting angles of the group F1' of reinforcement fibers and the group F2' of reinforcement fibers with respect to the axial direction in a winding region on the part of the rod section located beyond the distal end of the securing portion are smaller than intersecting angles of the group F1 of reinforcement fibers and the group F2 of reinforcement fibers with respect to the axial direction in a winding region on the securing portion. In addition, the prepreg sheet 30 is wound so as to be stretched in the axial direction, and thus it is possible for the prepreg sheet 30 when thermally cured to have a well-looking outer appearance without wrinkles formed therein.

When there is a large step height between the securing portion 10a and the surface Sa of the rod section, at the time of winding, wrinkles are likely to be formed in such a step height region. To avoid this, it is preferable that a tapered portion 10f be previously formed in the securing portion 10a so that the securing portion 10a has a thickness gradually decreasing toward a distal end thereof. Furthermore, it is preferable that an axial length L of the part of the rod section located beyond the distal end 10e of the securing portion 10a and having the prepreg sheet 30 wound thereon be previously set to be in a range of 2 mm to 5 mm. That is, when the axial length L is too short, the securing portion might be lifted and peeled off, or it is likely that any force applied thereto in a twisting direction leads to breakage of the securing portion. Conversely, when the axial length L is too long, bending of the rod section might be affected. The axial length L, therefore, is set to be in the above-described range so that these issues can be effectively suppressed.

As described above, in the fishing rod with the prepreg sheet 30 wound on the securing portion 10a, when heat-treated, a thermosetting resin reacts chemically, and when a given temperature (a curing temperature) is reached, the thermosetting resin loses flowability and thus is cured, so that the fishing line guide 10B is secured on the rod section. The prepreg sheet 30 is formed of plain-woven reinforcement fibers and disposed so that, on the securing portion 10a, the reinforcement fibers are in oblique directions with respect to the axial direction X. With this configuration, the prepreg sheet 30 is easily wound so as to correspond to a change in shape, and thus winding is facilitated. Also, in a secured state, inhibition of bending of the rod section is reduced, and twist strength at the securing portion is also increased, so that securing strength of the fishing line guide is improved. Particularly in this embodiment, the prepreg sheet 30 is wound so that, on the securing portion, the reinforcement fibers are at ±45°, and thus it is possible to provide a secured state well-balanced in the circumferential direction and the axial direction.

Furthermore, on a side beyond the distal end 10e of the securing portion 10a, with respect to the securing portion, an orientation of the reinforcement fibers relatively approximates to the axial direction, and thus it is less likely that rising of the reinforcement fibers occurs, so that it is possible to effectively hold down the securing portion 10a and thus to improve securing strength Moreover, the prepreg sheet 30 is wound and secured so that intersecting angles of the reinforcement fibers with respect to the axial direction in a winding region on the part of the rod section located beyond the distal end 10e of the securing portion 10a are smaller than intersecting angles of the reinforcement fibers with respect to the axial direction in a winding region on the securing portion 10a, and thus it is less likely that wrinkles are formed at a winding portion, thus achieving an improvement in outer appearance.

While the foregoing has described the embodiment of the present invention, the present invention is not limited to the above-described embodiment and is susceptible to various modifications.

While the fishing rod 1 shown in FIG. 1 is configured as an ordinarily jointed type, a joint structure of the rod sections may be a telescopic type, an inversely jointed type, or a socket-and-spigot jointed type. Furthermore, there may be a plurality of (two or more) intermediate rod sections or no intermediate rod sections. Furthermore, the fishing rod 1 may be formed of a single rod as a whole.

Furthermore, the fitting is not limited to a fishing line guide, and the above-described securing method can be applied also to a case of securing the reel seat 9 shown in FIG. 1. Furthermore, the oblique directions of reinforcement fibers on the securing portion are not limited to ±45°, and one group of reinforcement fibers among the reinforcement fibers may be wound at an angle larger than an angle at which the other group of reinforcement fibers are wound.

LIST OF REFERENCE NUMBERS

1 fishing rod
3 butt-side rod section (rod section)
5 intermediate rod section (rod section)
7 tip rod section (rod section)
9 reel seat (fitting)
10A, 10B, 10C fishing line guide (fitting)
10a securing portion
30 prepreg sheet
F1, F2 reinforcement fibers

What is claimed is:

1. A fishing rod, comprising:
    a molded rod section having a surface; and
    a fitting having a securing portion, the fitting being placed and secured on the surface of the rod section with a prepreg sheet wound on the securing portion of the fitting, the prepreg sheet being formed of plain-woven reinforcement fibers impregnated with a thermosetting resin,
    wherein the prepreg sheet is disposed so that the plain-woven reinforcement fibers are in oblique directions with respect to an axial direction, and
    the prepreg sheet is wound and secured so that intersecting angles of the plain-woven reinforcement fibers with respect to the axial direction in a winding region on a part of the rod section located beyond a distal end of the securing portion are smaller than intersecting angles of the plain-woven reinforcement fibers with respect to the axial direction in a winding region on the securing portion,
    wherein on the securing portion, the prepreg sheet is wound so that the plain-woven reinforcement fibers are at ±45° with respect to the axial direction, and on the part of the rod section located beyond the securing portion, the prepreg sheet is wound so that the plain-woven reinforcement fibers are at ±20° to ±40° with respect to the axial direction.

2. The fishing rod according to claim 1, wherein the prepreg sheet is wound in one or more plies so that overlapping portions of the prepreg sheet lie on the securing portion.

3. The fishing rod according to claim 1, wherein the part of the rod section located beyond the distal end of the securing portion and having the prepreg sheet wound thereon has an axial length in a range of 2 mm to 5 mm.

4. The fishing rod according to claim 1, wherein the prepreg sheet is wound in two or less plies on the rod section.

5. The fishing rod according to claim 1, wherein the securing portion is formed so as to have a thickness decreasing toward a distal end thereof.

6. The fishing rod according to claim 1, wherein the fitting is a reel seat.

7. The fishing rod according to claim 1, wherein the fitting is a fishing line guide.

8. A method for winding the prepreg sheet used in the fishing rod according to claim 1, the prepreg sheet being wound to secure the securing portion of the fitting on the rod section, the method comprising:
    winding, on the securing portion, the prepreg sheet in a circumferential direction, and winding, on the part of the rod section located beyond the securing portion, the prepreg sheet in the circumferential direction while applying a tension in the axial direction toward a proximal end side of the fishing rod.

* * * * *